United States Patent [19]

Chaffee

[11] Patent Number: 4,930,136
[45] Date of Patent: May 29, 1990

[54] SEGMENTED AIR COOLED LASER TUBE

[75] Inventor: Edwin G. Chaffee, Salt Lake City, Utah

[73] Assignee: American Laser Corporation, Salt Lake City, Utah

[21] Appl. No.: 319,661

[22] Filed: Mar. 7, 1989

[51] Int. Cl.$^5$ ............................................. H01S 3/03
[52] U.S. Cl. ..................................... 372/62; 372/34; 372/61; 372/65
[58] Field of Search ..................... 372/61, 62, 65, 34

[56] References Cited

U.S. PATENT DOCUMENTS

| | | | |
|---|---|---|---|
| 4,553,241 | 11/1985 | Chaffee | 372/62 |
| 4,752,936 | 6/1988 | Gerhardt | 372/62 |
| 4,805,180 | 2/1989 | Maitland et al. | 372/61 |

Primary Examiner—William L. Sikes
Assistant Examiner—B. R. R. Holloway

[57] ABSTRACT

A plurality of thin wall ceramic-metal segments are brazed together to form a gas laser tube assembly. Within each segment there is mounted a refractory metal ferrule with a central hole. The series of holes formed in the ferrules define the discharge bore. A plurality of ferrules are mounted in each segment and each ferrule is separately mounted within a heat dissipating fin structure.

6 Claims, 2 Drawing Sheets

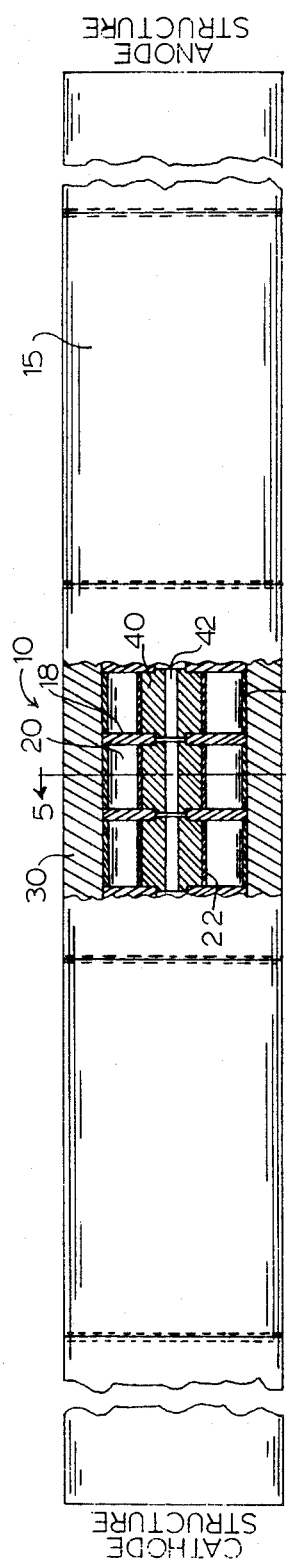
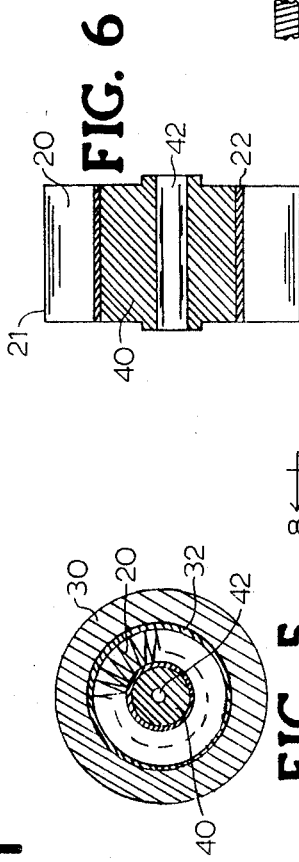
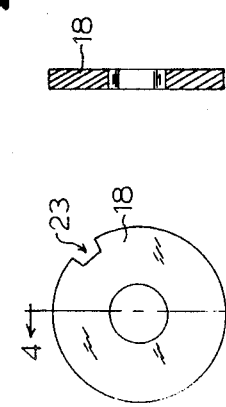
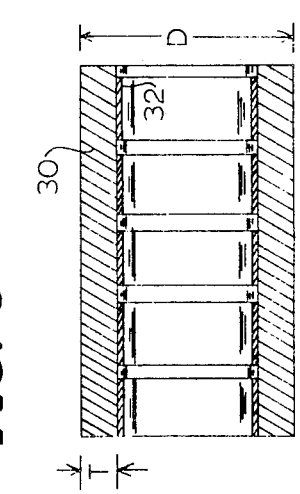
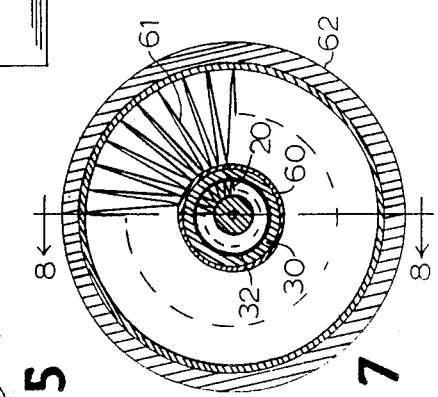
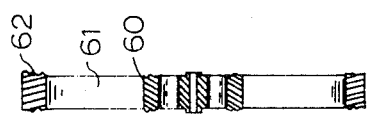

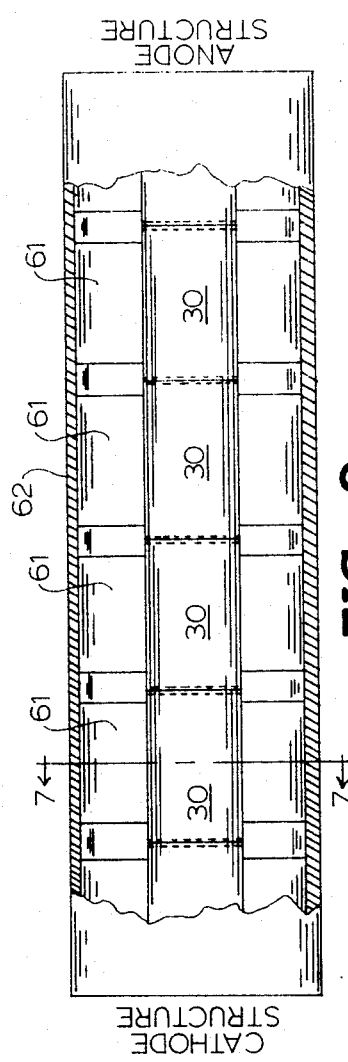
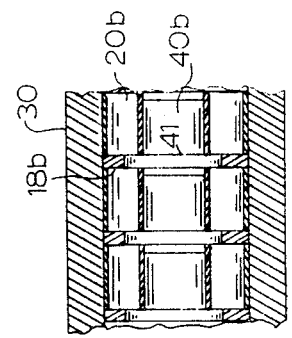
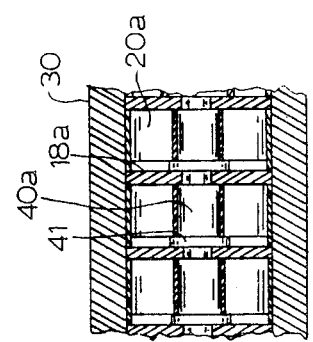
FIG. 9
FIG. 11
FIG. 10

SEGMENTED AIR COOLED LASER TUBE

BACKGROUND OF THE INVENTION

1. Technical Field

This invention relates to lasers and more particularly to an air cooled laser tube made up of a plurality of uniquely constructed segments.

2. Background Art

Both segmented and non-segmented laser tubes are known. It is also known to cool the laser tube with either air or a liquid such as water. For example, applicant's prior U.S. Pat. No. 4,774,713 teaches an air cooled laser tube having external fins. The tube is formed of relatively short segments with the bore of the tube being defined by ferrules supported within the segments by pairs of cup-like metal supports. A water cooled non-segmented tube is illustrated in U.S. Pat. No. 4,734,915 and with internally spaced discharge confining elements. U.S. Pat. No. 4,764,932 provides another example of an essentially solid tube with liquid cooling. Applicant's U.S. Pat. No. 4,553,241 teaches another type of air cooled, segmented laser tube in which the discharge confining elements are in the form of refractory metal discs supported within relatively short segments.

In the art of air cooled segmented laser tube constructions, alumina has been used to form the tube but has the disadvantage of poor thermal conductivity. For air cooled tubes having external fins, beryllia provides a better thermal conductivity. A tube formed of beryllia also facilitates transferring heat axially in those areas where the air cooling fins on the exterior of the tube are necessarily spaced apart to provide proper air flow. Experience with the air cooled, segmented tube construction shown in U.S. Pat. No. 4,553,241 has lead to the recognition that while both the disc system of U.S. Pat. No. 4,553,241 and the ferrule system of U.S. Pat. No. 4,774,713 have demonstrated advantages over the solid tube-type construction, there is a need for an improved air cooled laser tube construction which permits the use of relatively long segments to facilitate the mounting and efficiency of external air cooling fins and to minimize the number of sealed connections between segments. The use of relatively long segments in water cooled tubes is known to reduce electrolysis and provide an acceptable electrical isolation. The sought for improved air cooled tube construction would also ideally mount a series of suitably cooled, discharge confining ferrules or discs within each of a plurality of relatively long segments. However, the art has not heretofore provided an air cooled laser tube construction permitting a plurality of discharge confining ferrules or discs to be mounted in each of several relatively long segments making up the overall tube.

When disc supports are brazed within a long, water cooled tube formed of alumina as in U.S. Pat. Nos. 4,378,600 or 4,734,915, it will be apparent that the internal diameter of the tube must be large enough to house the cathode. Therefore, efficiency is necessarily reduced and cost is added as compared to using a smaller, more efficient tube. Brazing of the discharge confining disc to beryllia cannot be achieved though it might be desirable and assembly of the numerous disc subassemblies within the relatively long tube is difficult.

With the foregoing in mind, the primary objective of the present invention is to provide a further improved air cooled segmented laser tube construction which permits use of relatively long segments and discharge confining ferrules. While primarily concerned with providing an improved air cooled segmented laser tube, the construction of the invention lends itself to water cooling as later described. Other objects will become apparent as the description proceeds.

SUMMARY OF THE INVENTION

The improved air cooled laser tube construction of the invention in a preferred embodiment utilizes relatively long beryllia formed segments. Within each segment there is mounted a plurality of discharge confining ferrules. Each ferrule is supported by a heat dissipating, axially extending fin structure having a cavity in which the respective ferrule is mounted. An optional baffle disc or other means is provided to establish a tortuous gas return path.

BRIEF DESCRIPTION OF DRAWINGS

FIG. 1 is a longitudinal, fragmentary, side elevation view illustrating a laser tube structure according to the invention.

FIG. 2 is a sectional view taken through one of the segments and illustrating a series of axially spaced metallic pads suited for mounting the later emplaced ferrule-fin support structures.

FIG. 3 is a plan view of an optional baffle employed between each pair of ferrule-fin support subassemblies.

FIG. 4 is a cross-sectional view taken in the direction of line 4—4 of FIG. 3.

FIG. 5 is a cross-sectional view taken in the direction of line 5—5 of FIG. 1.

FIG. 6 is a cross-sectional view of a ferrule-fin subassembly.

FIG. 7 is a reduced end view of the FIG. 5 segment illustrating cooling fins incorporated with the individual segment subassemblies.

FIG. 8 is a reduced section view taken along line 8—8 of FIG. 7.

FIG. 9 is a longitudinal side elevation view of the FIG. 1 tube with a set of external cooling fins as in FIG. 8.

FIG. 10 is a longitudinal fragmentary side elevation view like FIG. 1 but of a second embodiment.

FIG. 11 is a longitudinal fragmentary side elevation view like FIG. 1 but of a third embodiment.

DESCRIPTION OF THE PREFERRED EMBODIMENT

A segmented air cooled argon-ion laser tube 10 is used by way of example. The usual cathode and electrode assemblies at the end of the tube have been eliminated as well as vacuum, cooling and power equipment and other housing structures surrounding the tube to simplify the description. Reference is made initially to FIGS. 1-9.

Tube 10 is made up of a plurality of individual, electrical or relatively long segment subassemblies 15, the number and size of which will vary with the type laser to which the invention construction is applied. Each subassembly 15 comprises plural, relatively thin, folded, axially extending metallic fin support structures 20, a ceramic segment 30 and plural refractory metal ferrules 40. Individual segments 30 are secured to each other in a hermetically-bonded relation by a suitable brazing alloy such as by use of a Kovar ring and in a manner which precludes establishment of an electrical path between either electrode and any cooling medium flowing external of the tube. Fin structure 20 is preferably formed of a metal such as copper with excellent heat conductive properties of a thickness of about 0.005–0.030 inches and provides a cavity 22 in which a respective ferrule 40 is mounted. Each segment 30 is formed of a suitable ceramic such as alumnia or beryllia and each ferrule 40 is formed of a refractory metal such as tungsten or molybdenum or of pyrolytic graphite or of a ceramic such as beryllia.

Within each segment 30 there is mounted a plurality, e.g., five, of axially spaced sub-assemblies each of which is made of a ferrule 40 mounted within and brazed to a fin support structure 20. The segment 30 is prepared by forming a plurality of axially spaced metal pads 32 within the interior wall surface of segment 30. The outer peripheral surface 21 of each fin structure 20 is joined to the ceramic segment 30 by a braze connection employing the metal pads 32. An optional ceramic disc baffle 18 is placed between each pair of ferrules 40 and provides a gas discharge opening 23 with the gas discharge openings 23 being radially offset from one baffle to the next.

The series of ferrules 40 confine the plasma and define the bore 42, typically 0.045 inch to 0.157 inch, through which a laser discharge takes place under vacuum conditions established in tube 10. Each ferrule 40 and the laser discharge are thus in thermal contact during operation of the laser. Ferrules 40 by reason of being of a refractory material are also designed to withstand intense ion bombardment without melting and to efficienctly transfer the heat to the fin support members 20. Heat transferred to the refractory metal ferrule 40 by the laser discharge is thus transferred to the fin structure 20 and then through the periphery 21 to the wall of the ceramic material comprising the segment 30. The wall thickness T (FIG. 2) is preferably in the range of 0.1 inch to 0.2 inch for an outer diameter D of within about 1 to 2 inches. The heat emitted by the outer peripheral surface of the fin structure 20 is finally transferred to the cooling medium such as air being used for illustration.

Making reference to FIGS. 7 and 8, an outer metalized surface 60 is provided on each segment 30 to which outer heat dissipating fins 61 are secured and are mounted within a suitable housing 62. The fins 61 mounted on one segment 30 are aligned with the fins 61 on any mating interfaced segment. Sets of fins 61 are spaced apart a slight distance as schematically illustrated in FIG. 9.

While not illustrated, it will be appreciated that by eliminating the sets of fins 61 and adding a cooling housing over the tube 10 with entry and exit ports, the tube 10 structure of FIG. 1 readily adapts to a water cooled system. In use, cooling air is blown axially through the fins 61 and through housing 62 from a cooling air source, not shown. The inner bores of fins 61 are essentially concentric with the inner bores of fins 20 and provide numerous heat transmission paths from the ferrules to the outside environment.

FIGS. 10 and 11 represent second and third embodiment ferrule-fin-baffle configurations. In FIG. 10, the ferrule 40a is formed with a flange portion 41 and is mounted with a modified baffle 18a in the manner illustrated. A fin structure 20a surrounds the hub portion of ferrule 40a.

In another embodiment seen in FIG. 11, the flange portion 41 of ferrule 40b mounts within an aperture provided in a further modified baffle disc 18b and the hub portion of ferrule 40b is received within a suitably dimensioned fin structure 20b. The axially-aligned, individual ferrules are slightly spaced apart in all embodiments and in all embodiments the many advantages of achieving a segmented tube with essentially solid bore characteristics are achieved. So far as is known, the present invention represents the only known gas discharge laser having a series of segments, each with axially-aligned fin-supported ferrules for forming the bore and providing an essentially solid bore-like character in operation.

What is claimed is:

1. A laser tube comprising:
   (a) a plurality of axially-aligned, elongated, thin wall cylindrical segments of electrically-insulating material successively disposed between electrodes at anode and cathode ends in hermetically bonded relationship with one another and forming an outer wall of the laser tube, each said cylindrical segment defining within the wall thereof a longitudinal extending central cavity;
   (b) a plurality of axially-extending and axially-spaced heat dissipating fin structures supported within and secured to the internal wall of each segment, each fin structure having a central cavity aligned with the central cavity of other fin structures within the same segment;
   (c) a ferrule within each fin structure cavity providing a plurality of axially-spaced ferrules in each segment having an overall length less than the length of the segment in which such plurality of ferrules are installed, said segments each containing plural said ferrules establishing a gas discharge bore;
   (d) metallic securing means disposed between and bonded to the facing end surfaces of adjacent ones of said cylindrical segments; and
   (e) means operatively associated with said fin structures and ferrules establishing a gas return path.

2. A gas laser tube as claimed in claim 1 including between each pair of said ferrules a baffle formed as a disc with the ends of each pair of ferrules separated by a said baffle being formed to be contained within an aperture formed in said baffle and including a gas return aperture on the periphery thereof.

3. A gas laser tube as claimed in claim 1 wherein each said segment includes a plurality of axially spaced metal bands formed on the internal surface thereof with the outer periphery of said sets of fin structures being secured to said segment utilizing said metal bands as a securing means.

4. A gas laser tube as claimed in claim 1 including between each pair of said ferrules a baffle formed as a disc, said ferrules having a flange at one end adapted to rest against one side of said baffle adjacent an aperture formed in said baffle.

5. A gas laser tube as claimed in claim 1 including between each pair of said ferrules a baffle formed as a disc, said ferrules having a flange at one end formed to be contained within an aperture formed in said baffle.

6. A gas laser tube as claimed in claim 1 including additional fin structure surrounding said segments and mounted within a housing thereby providing air passages for cooling said tube.

* * * * *